United States Patent
Maeda et al.

(10) Patent No.: US 6,608,802 B1
(45) Date of Patent: Aug. 19, 2003

(54) DISK DRIVE APPARATUS HAVING IMPROVED POWER CONSUMPTION

(75) Inventors: Nobuyuki Maeda, Yokohama (JP); Shinya Fujimori, Yokohama (JP); Seiichi Kato, Ibaraki (JP); Michio Miura, Yokohama (JP); Akio Yabe, Fujisawa (JP)

(73) Assignees: Hitachi, Ltd., Tokyo (JP); Hitachi Media Electronics Co., Ltd., Yokohama (JP)

(*) Notice: Subject to any disclaimer, the term of this patent is extended or adjusted under 35 U.S.C. 154(b) by 0 days.

(21) Appl. No.: 09/528,756

(22) Filed: Mar. 17, 2000

(30) Foreign Application Priority Data

Mar. 18, 1999 (JP) .......................................... 11-073106

(51) Int. Cl.[7] ............................................... G11B 7/00
(52) U.S. Cl. ................................ 369/44.15; 369/44.14; 359/814
(58) Field of Search ....................... 369/44.14, 44.15, 369/44.16, 44.21, 44.22; 359/812, 813, 814

(56) References Cited

U.S. PATENT DOCUMENTS

| | | | | |
|---|---|---|---|---|
| 5,467,328 A | * | 11/1995 | Murakami et al. | 359/814 |
| 5,488,603 A | * | 1/1996 | Tomita et al. | 359/814 |
| 5,761,183 A | * | 6/1998 | Ikegame | 369/220 |
| 5,798,988 A | * | 8/1998 | Koyama | 369/44.14 |
| 5,812,517 A | * | 9/1998 | Nagasato et al. | 369/219 |
| 5,877,904 A | * | 3/1999 | Kawano et al. | 359/814 |
| 5,886,978 A | * | 3/1999 | Matsui | 359/813 |
| 5,986,825 A | * | 11/1999 | Marino et al. | 359/808 |
| 6,084,834 A | * | 7/2000 | Kawano et al. | 369/44.14 |
| 6,160,771 A | * | 12/2000 | Kawano et al. | 369/44.14 |

FOREIGN PATENT DOCUMENTS

JP  10162386 A  6/1998

* cited by examiner

*Primary Examiner*—Thang V. Tran
*Assistant Examiner*—Bach Vuong
(74) *Attorney, Agent, or Firm*—Townsend and Townsend and Crew LLP

(57) ABSTRACT

According to the invention, techniques for minimizing power consumption in optical disk drives. Embodiments according to the present invention can provide disk drives with optimal positioning of a fixing part of an objective lens driving unit incorporated therein. Spatial location of magnets can also be determined in order to reduce the power consumption and the torsion of the lens.

12 Claims, 9 Drawing Sheets

(a)　　　　　　　　　　　(b)

DISK DRIVE APPARATUS HAVING IMPROVED POWER CONSUMPTION

CROSS-REFERENCES TO RELATED APPLICATIONS

This application claims priority from Japanese Patent Application Reference No. 11-073106, filed Mar. 18, 1999, the entire content of which is incorporated herein by reference for all purposes.

BACKGROUND OF THE INVENTION

The present invention relates generally to disk drives for computer applications, and specifically to systems and apparatus used in reproducing an optical disk and/or a magneto-optical disk.

Conventional disk drives typically employ a biaxial orthogonal translational objective lens driving unit in which the moving part for holding an objective lens is supported by elastic support members. A perceived advantage of such construction is that the driving unit can be made in a small size at low cost. On the other hand, a lack of rigidity in some support members can cause bending and twisting of some components. Such bending and twisting of support members can result in undesirable power consumption in certain drive dispositions.

For example, if the objective lens driving unit is placed horizontally, the moving part will sink downward in the focusing direction under its own weight. Accordingly, it will be necessary to counter this sinking by supplying an offset current for canceling the sinking of the moving part.

What is really needed is an apparatus for correcting for forces and moments acting upon lens holders in disk drives.

SUMMARY OF THE INVENTION

According to the invention, techniques for minimizing power consumption in optical disk drives are provided. Embodiments according to the present invention can provide disk drives with optimal positioning of a fixing part of an objective lens driving unit incorporated therein. Spatial location of magnets can also be determined in order to reduce the power consumption and the torsion of the lens.

In a representative embodiment, an optical disk drive is provided. The optical disk drive can comprise variety of components. For example, a spindle motor for rotating an optical disk can be part of the disk drive. Further, a laser source for generating a light beam can also be part of the disk drive. The disk drive can also include an optical head. The optical head can have an objective lens to converge the light beam onto a recording portion of the surface of the optical disk, a lens holder to hold the objective lens, a plurality of elastic support members to elastically support the lens holder, and a fixing part to fix the elastic support members, for example.

The fixing part, the plurality of elastic support members and the optical head can operatively dispose a front of the objective lens at a working distance from the surface of the optical disk, at a working distance variable between a first working distance, W.D.1, and a second working distance, W.D.2, for example.

The optical head can operatively dispose the objective lens at a distance, L holder, between the front of the objective lens and a center of a plurality of fixing points of the elastic support members on the lens holder in a focusing direction orthogonal to the radius of the optical disk. The fixing part can be operatively disposed at a distance, L wire, between the surface of the optical disk and a center of a plurality of fixing points of the elastic support members on the fixing part in the focusing direction, C wire.

The lens holder can be disposed in a direction orthogonal to the radius of the optical disk and receding from the surface of the optical disk a distance, d, which is the distance the plurality of elastic support members are biased by a weight of the lens holder in a state that the disk drive is placed substantially horizontally.

The disk drive can also include a slider for moving the optical head in a radius direction of the optical disk. The objective lens, the lens holder, the plurality of elastic support members and the fixing part can be disposed to satisfy the relation:

$$(W.D.1+W.D.2)/2+L\ holder-d <= L\ wire <= (W.D.1+W.D.2)/2+L\ holder.$$

In a specific embodiment according to the present invention, an optical disk drive can be provided wherein the objective lens, the lens holder, the plurality of elastic support members and the fixing part are disposed substantially according to the relation:

$$L\ wire=(W.D.1+W.D.2-d)/2+L\ holder.$$

In another specific embodiment according to the present invention, an optical disk drive can be provided in which the optical head also includes a magnet. The optical head can be arranged so that a center position of the magnet in the focusing direction, C mag, can be disposed a distance of substantially d/2 from C wire in a direction orthogonal to the radius of the optical disk and receding from the surface of the optical disk, for example.

In a further specific embodiment according to the present invention, an optical disk drive can be provided in which the optical head may be moved within a movable range having a center. The optical head can be disposed at the center of the movable range, such that a point on the surface of the objective lens in the focusing direction, C lenz, is disposed a distance from the optical disk surface of approximately (W.D.1+W.D.2)/2.

Numerous benefits are achieved by way of the present invention over conventional techniques. The present invention can provide a disk drive in a small size with low cost. Many specific embodiments according to the present invention can operate at reduced power consumption compared with conventional disk drives known in the art. Specific embodiments can reduce the tilt of the disk drive lens. Select embodiments can comprise an optimal mounting position of a disk drive lens carrier's fixed part and magnets. Some embodiments can provide a disk drive that suppresses an increase of a power consumption arising when different types of disks are reproduced, as well as increases of power consumption and tilt of the lens arising from changes in disposed attitude of the disk drive, for example.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

Conventional disk drives typically employ a biaxial orthogonal translational objective lens driving unit in which the moving part for holding an objective lens is supported by elastic support members. A perceived advantage of such construction is that the driving unit can be made in a small size at low cost. However, since the rigidity of the elastic support members in the direction of extension is low, when a moment around that direction is induced, the objective lens is easily displaced. If the objective lens driving unit is placed horizontally, the moving part will sink downward in the focusing direction (i.e., orthogonal to the radius of the disk) under its own weight. Accordingly, it will be necessary to supply the focusing coil with an offset current for canceling the sinking of the moving part. As a result, the power consumption of the objective lens driving unit will increase.

Some embodiments minimize the increased power consumption by bringing the distance between the front of the objective lens and the disk surface so that the moving part sinks under its own weight into coincidence with the working distance (W.D.) of the objective lens, for example. Further details regarding operation of low power disk drive units employing such techniques can be had by reference to a Japanese Published Unexamined Patent Application No. Hei 10-162386, the entire contents of which is incorporated herein by reference for all purposes.

Figure 1:
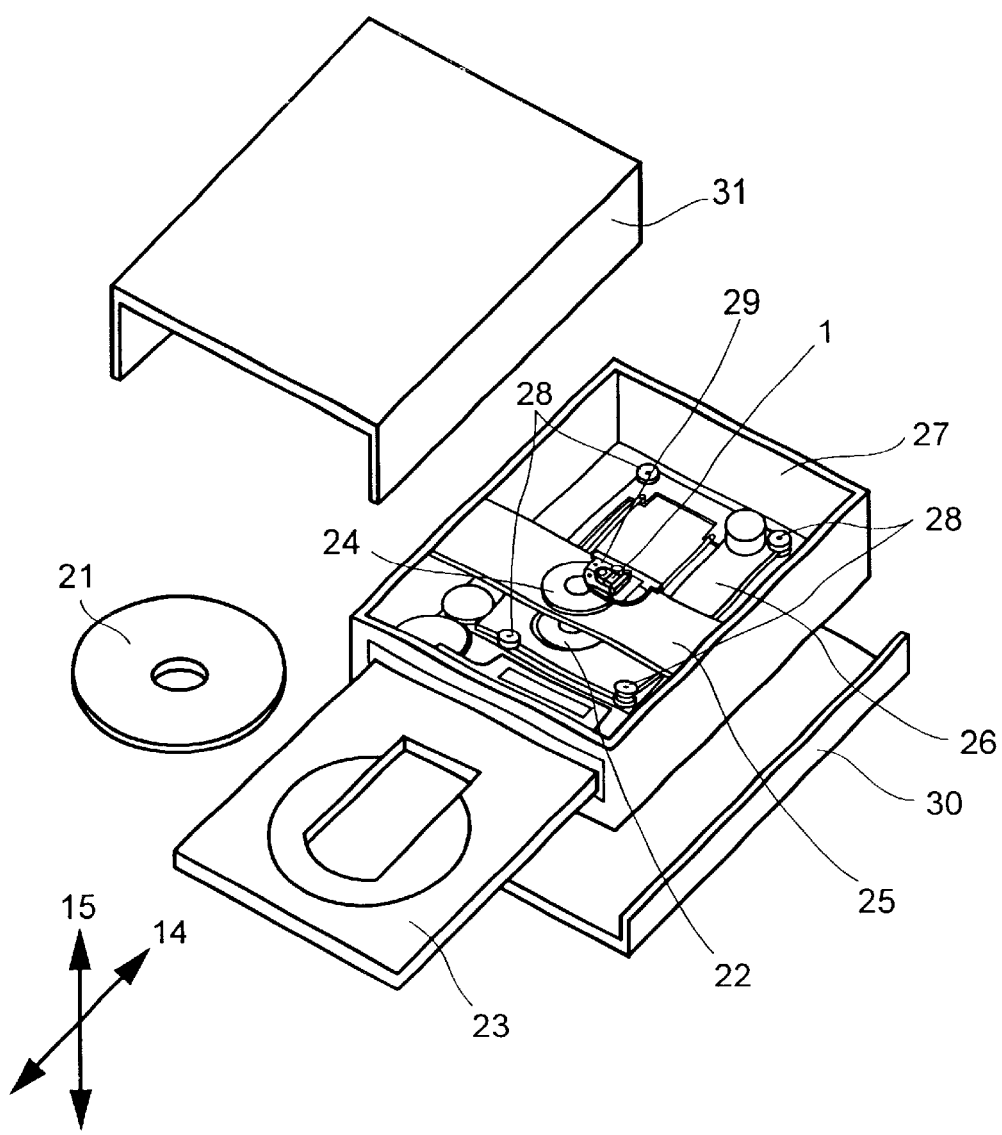
FIG. 1 illustrates a simplified schematic perspective view of a representative example disk drive in a particular embodiment according to the present invention.

FIG. 1 illustrates a simplified schematic perspective view of a representative example disk drive in a particular embodiment according to the present invention. This diagram is merely an illustration and should not limit the scope of the claims herein. One of ordinary skill in the art would recognize other variations, modifications, and alternatives. FIG. 1 illustrates a disk drive 20 having an objective lens driving unit 1 incorporated within it. Disk drive 20 can include a disk loading mechanism (not illustrated) for loading and unloading a disk 21 placed onto a disk tray 23 into or out of the drive. Once carried into the drive, disk 21 is placed on a turntable 22 which is assembled integrally with a rotary shaft of a spindle motor, and the disk is captured by a clamper 24 fastened to a clamper holder 25 to be firmly secured to the turntable.

The spindle motor rotates the disk 21, and a head 29, which can be mounted on a unit mechanism chassis 26, reads information recorded on the disk 21. The head 29 is installed on the carriage base (not illustrated) which can make a coarse movement in the loading direction (TR direction) 14 of the disk tray 23, and holds the objective lens driving unit 1. The unit mechanism chassis 26 is fastened to a mechanism base 27 through vibration isolating legs 28 made of an elastic material. Further, the whole drive is enclosed with a top cover 31 and a bottom cover 30. Drive 20 is merely a representative example of one of many types of drive configurations suitable to embody the techniques of the present invention. Other types of drive configurations, materials and the like will be readily apparent to those of ordinary skill in the art.

Figure 2:
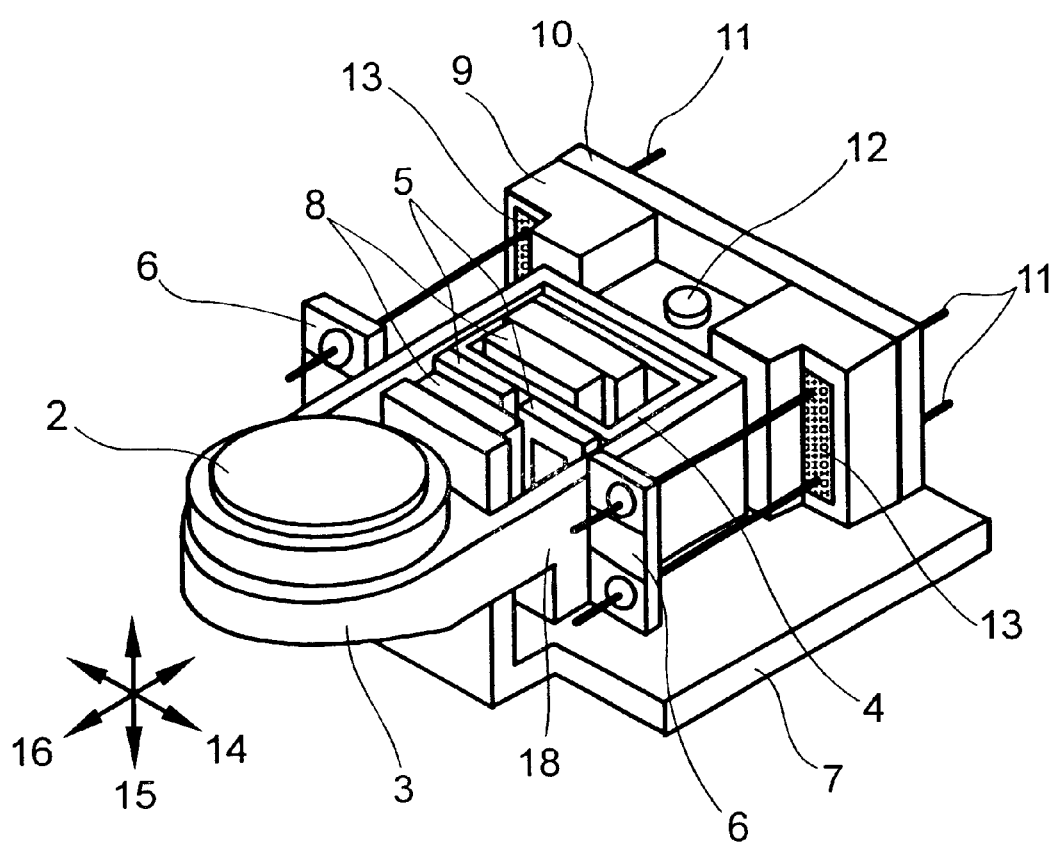
FIG. 2 illustrates a simplified schematic perspective view of a representative example of a biaxial orthogonal translational objective lens driving unit in a particular embodiment according to the present invention.

FIG. 2 illustrates a simplified schematic perspective view of a representative example of the biaxial orthogonal translational objective lens driving unit in a particular embodiment according to the present invention. This diagram is merely an illustration and should not limit the scope of the claims herein. One of ordinary skill in the art would recognize other variations, modifications, and alternatives. FIG. 2 illustrates an objective lens driving unit 1 mounted on a carriage base (not illustrated) that is movable in the radial direction (tracking direction 14) and in parallel to the information recorded surface of an optical disk. An optical disk (not illustrated) can be disposed to the head.

A lens holder 3 is assembled with an objective lens 2, a focusing coil 4 ("AF coil"), two tracking coils 5 ("TR coil"), and two small boards 6, which form a moving part 18. A base yoke 7 attached to an upper yoke (not illustrated) mounts two magnets 8, which forms the magnetic circuit of this driving unit. The lens holder 3 can be supported by four elastic support members 11 jointed to the small board 6, whereby the lens holder 3 is made movable in the focusing direction (AF) 15 and the tracking direction (TR) 14 with its attitude maintained. The base yoke 7 mounts a fixing part holder 9 attached to a fixing board 10. The other ends of the elastic support members 11 are fixed to the fixing board 10. A visco-elastic material 13 is applied to the fixing part holder 9, which reduces undesirable vibrations of the elastic support members 11.

Figure 3:
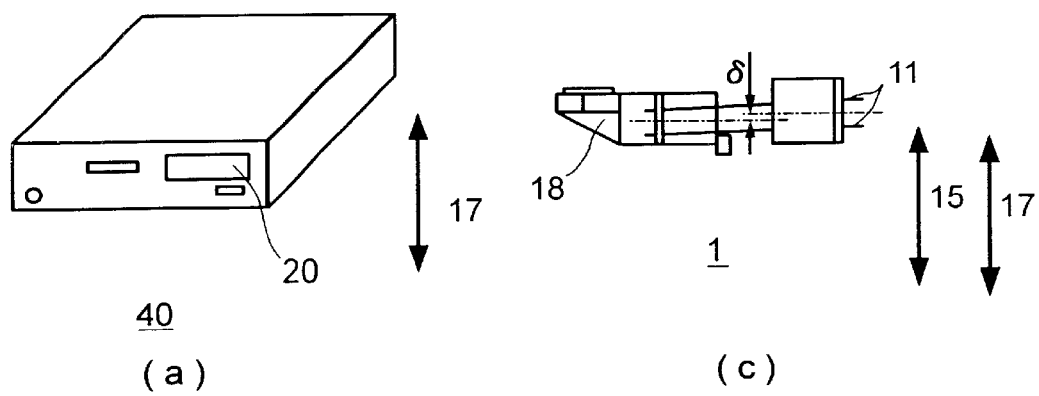
FIG. 3 illustrates a simplified schematic drawing of representative dispositions for a P.C. that can mount a disk drive and an objective lens driving unit in a particular embodiment according to the present invention.
Figure 3:
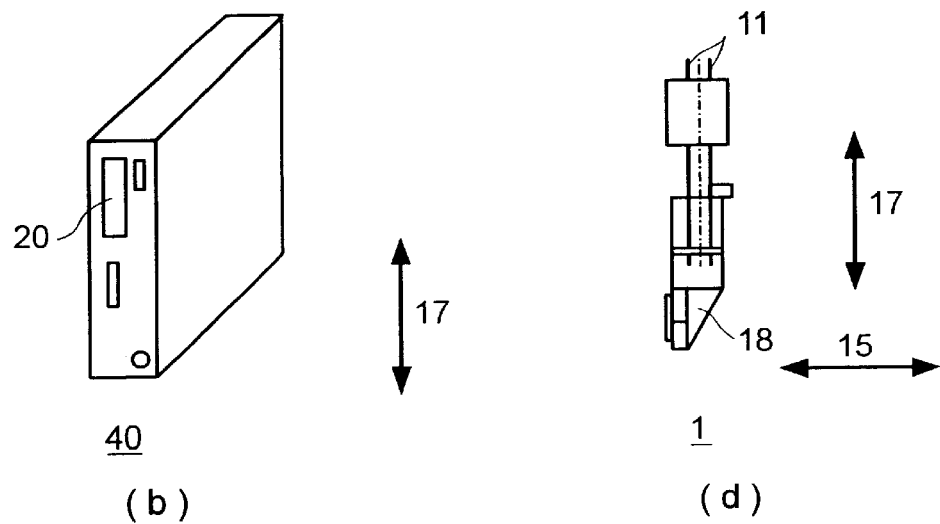

FIG. 3 illustrates a simplified schematic drawing of representative configurations for a P.C. that comprises a disk drive in a particular embodiment according to the present invention. This diagram is merely an illustration and should not limit the scope of the claims herein. One of ordinary skill in the art would recognize other variations, modifications, and alternatives. FIG. 3(a) and FIG. 3(b) are schematic drawings of representative disposed attitudes for a personal computer 40 (hereunder, denoted as P.C.) suitable for mounting disk drive 20, for example. FIG. 3(c) and FIG. 3(d) are schematic drawings of representative dispositions of the objective lens driving unit 1 in corresponding P.C. dispositions illustrated by FIG. 3(a) and FIG. 3(b), respectively. An arrow 17 indicates the vertical direction. In a representative embodiment, a desktop P.C. can be used in a horizontal setting as shown in FIG. 3(a), or in the vertical setting as shown in FIG. 3(b). When the P.C. is in the horizontal setting, the objective lens driving unit 1 is also placed horizontally, as shown in FIG. 3(c). In this case, since the AF direction 15 coincides with the vertical direction 17, the moving part 18 sinks downward in the AF direction under its own weight, as shown in FIG. 3(c). In FIG. 3(c), d indicates the displacement of the moving part 18 due to its own weight.

When the P.C. is disposed vertically, as illustrated in FIG. 3(b), the elastic support members 11 suspend the moving part 18 along the vertical plane. As shown in FIG. 3(d), the moving part 18 does not sink under its own weight in the AF direction 15. Sinking in the vertical direction 17 is almost zero. Thus, the disposition d, of the moving part 18 varies depending on the disposed attitude of the objective lens driving unit 1. In a representative embodiment according to the present invention, disk drives used with the objective lens driving unit 1 placed horizontally, do not incur increased power consumption. However, when the drive is used while the objective lens driving unit 1 is placed vertically, an increase in power consumption occurs. Further, the mounting position of the magnets in the AF direction can influence both the power consumption of the objective lens driving unit 1, as well as the tilt of the lens.

In a representative embodiment according to the present invention, an objective lens driving unit can assume a substantially similar configuration as that of example drive unit 1 illustrated in FIG. 2. A disk drive unit can assume a substantially similar configuration to the example drive unit 20 illustrated in FIG. 1.

Figure 4:
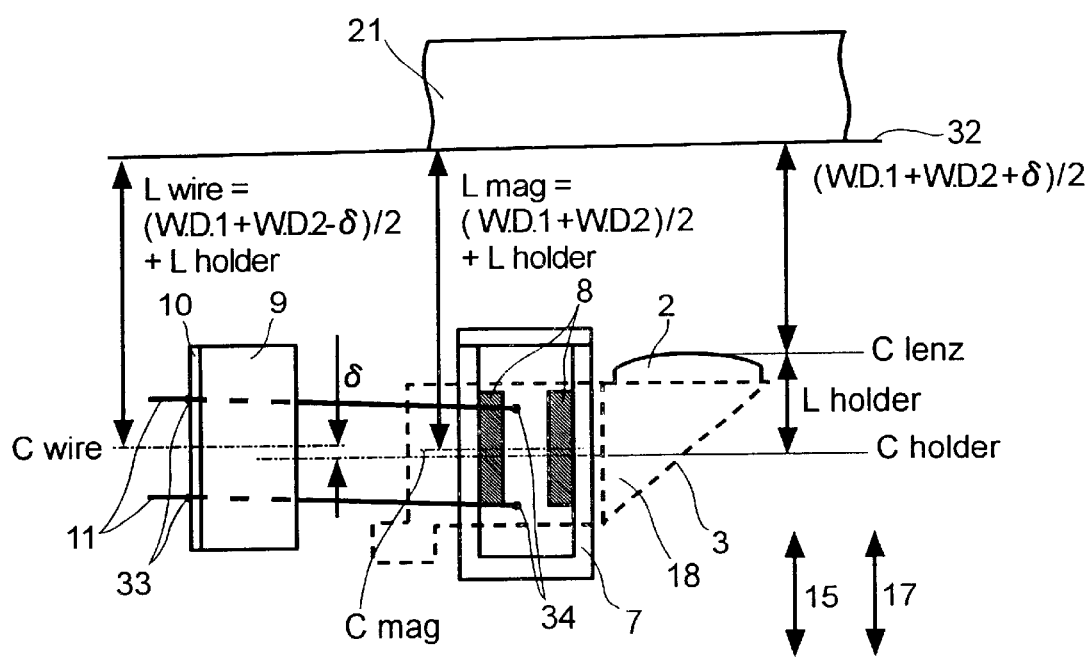
FIG. 4 illustrates a simplified schematic drawing of a representative embodiment of a disk drive in a particular embodiment according to the present invention.

FIG. 4 illustrates a simplified schematic drawing of a representative objective lens driving unit 1 within disk drive 20 in a particular embodiment according to the present invention. This diagram is merely an illustration and should not limit the scope of the claims herein. One of ordinary skill in the art would recognize other variations, modifications, and alternatives. In FIG. 4, the shape of the lens holder 3 is illustrated by dotted lines. The front surface of objective lens 2 is denoted by "C lenz." The center of fixing points 34 of the elastic support members 11 to the lens holder 3 in the focusing direction 15 is denoted by "C holder." "L holder" indicates the distance between C lenz and C holder. The spatial position of optical disk 21 is illustrated with reference to C lenz and L holder.

C wire represents the center of fixing points 33 of the elastic support members 11 on the fixing board 10 in the focusing direction 15. The distance between the surface 32 of the optical disk 21 facing to the objective lens 2 and C wire is signified by L wire. C mag represents the center of the magnets 8 in the AF direction 15. The distance between the surface 32 of the optical disk 21 facing to the objective lens 2 and C mag is signified by L mag. In disk drive 20, L wire and L mag can be set according to the following relationships:

$$L \text{ wire}=(W.D.1+W.D.2-d)/2+L \text{ holder}$$

$$L \text{ mag}=(W.D.1+W.D.2)/2+L \text{ holder}$$

Here, d represents the distance the lens holder is disposed in a direction orthogonal to the radius of the optical disk and receding from the surface of the optical disk. This "sinking distance," being the distance the plurality of elastic support members 11 are elastically deformed by the weight of moving part 18, causing the objective lens 2 to be biased downward away from the optical disk 21 under its own weight. Next, the reason that the disk drive takes on the configuration shown in FIG. 4 will be explained in detail.

Figure 5:
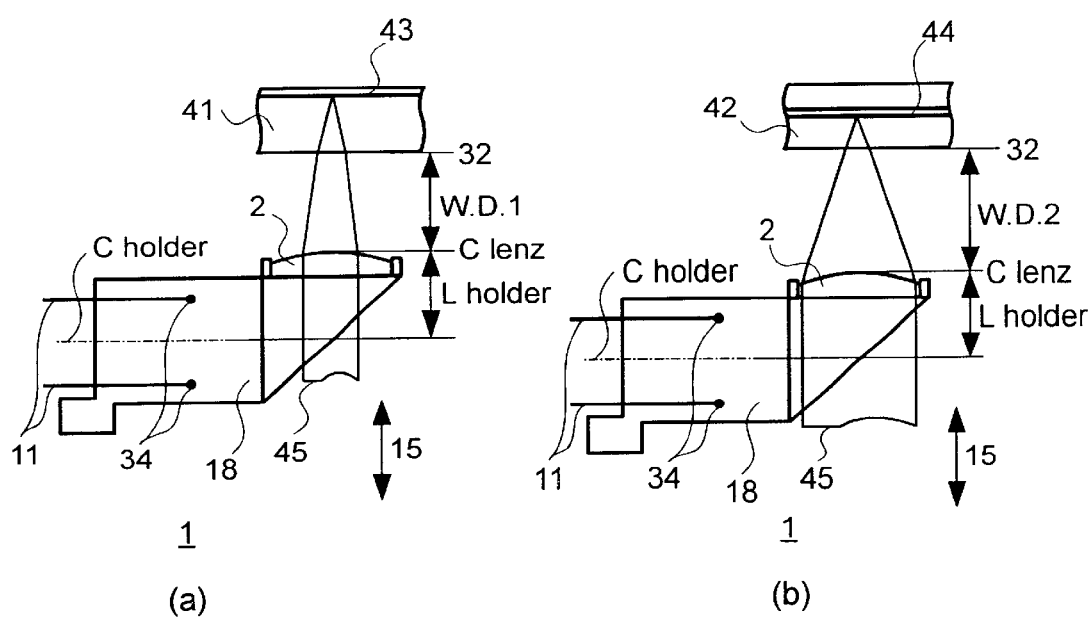
FIG. 5 illustrates a simplified schematic drawing of a representative spatial relationship for focusing on different types of disks in a particular embodiment according to the present invention.

FIG. 5 illustrates a simplified schematic drawing of a representative spatial relationship when focusing on different types of disks in a particular embodiment according to the present invention. This diagram is merely an illustration and should not limit the scope of the claims herein. One of ordinary skill in the art would recognize other variations, modifications, and alternatives. As shown in FIG. 5, W.D.1 and W.D.2 represent a distance (W.D.: working distance) between the disk surface 32 and C lenz, for different types of disks 41, 42, which can be, for example, CD and DVD, and the like. Disks 41 and 42 can be placed in the disk tray of the disk drive and laser beam 45 can be focused on recorded surfaces 43 and 44, respectively. The working distance to disk 41 is signified by W.D.1, and the working distance to disk 42 is signified by W.D.2 (here, W.D.1<W.D.2).

Disk 41 can be placed at a position to minimize power consumption when the components of disk drive 20 are arranged so that the distance between the disk surface 32 to C lenz is approximately equal to W.D.1 and no electrical currents flow through AF coil 4. However, when disk 42 is substituted for disk 41, moving part 18 would need to be displaced by approximately (W.D.2−W.D.1). This can be accomplished, by causing an offset current to flow through the AF coil 4. Therefore the power consumption will increase significantly when disk 42 is read by disk drive 20. A similar condition arises when the components of disk drive 20 are arranged in such a manner that the power consumption is at a minimum during reproduction of disk 42, and then disk 41 is loaded into the drive.

In a representative embodiment according to the present invention, if the components are arranged such that the distance between the disk surface 32 and C lenz is equal to (W.D.1+W.D.2)/2 and no electrical currents flow through AF coil 4, the absolute value of the offset current required for reproducing disk 41 will be substantially equal to the offset current required for reproducing the disk 42, and the total power consumption will become minimum. Therefore, it is preferable to configure the components so as to satisfy the foregoing condition. But as noted above, the position of moving part 18 shifts depending on the disposition of the driving unit 1. Accordingly, if the distance between the disk surface 32 to C lenz is made equal to (W.D.1+W.D.2)/2 in the horizontal setting of the driving unit 1, an increase of the power consumption in the vertical setting will occur. If the distance between the disk surface 32 to C lenz is made equal to (W.D.1+W.D.2)/2 in the vertical setting of the driving unit 1, a similar situation occurs.

Accordingly, in a representative embodiment according to the present invention, the distance between the disk surface 32 and C wire in disk drive 20 can be approximately (W.D.1+W.D.2−d)/2+L holder when no electrical currents flow through AF coil 4. Thereby, the absolute value of the offset current required in the horizontal setting is made equal to that of the offset current required in the vertical setting. Thus, disk drive 20 in a representative embodiment according to the present invention, reduces the variations of the offset currents depending on the disposed attitude of the objective lens driving unit 1 and the different types of the disks, and minimizes the total power consumption.

Since the objective lens driving unit 1 has a low rigidity around the extending direction 16 of elastic support members 11, a moment induced around the direction 16 can easily incline the objective lens. Next, referring to FIG. 6 and FIG. 7, methods for reducing moments around extending direction 16 arising from the magnetic circuit comprised by AF coil 4 and TR coil 5 will be discussed.

Figure 6:
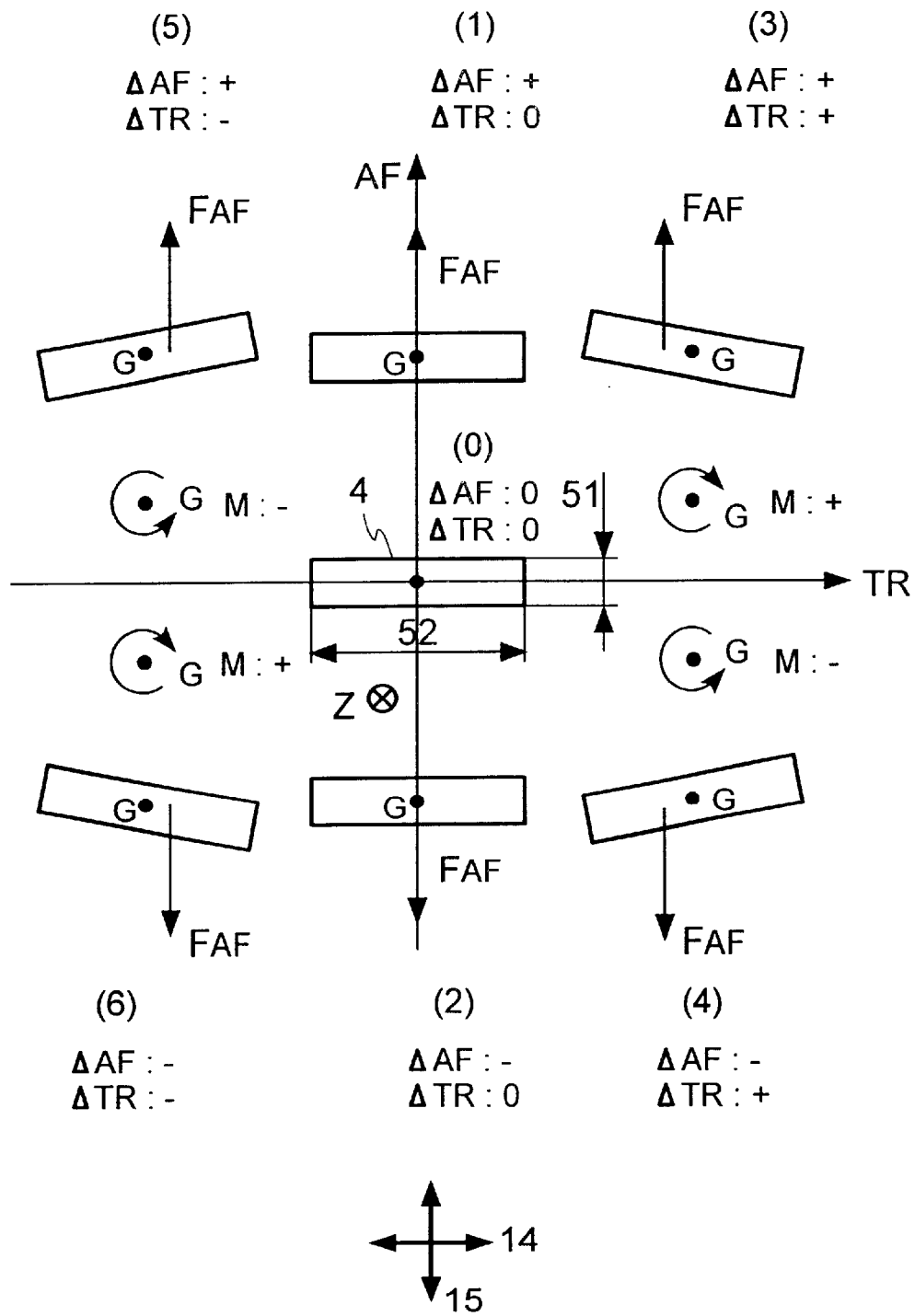
FIG. 6 illustrates a simplified schematic drawing of a representative moment in a focusing coil in a particular embodiment according to the present invention.

FIG. 6 illustrates a simplified schematic drawing illustrating the principal of inducing a moment in the AF coil 4 and the direction of the moment on the following condition in a particular embodiment according to the present invention. This diagram is merely an illustration and should not limit the scope of the claims herein. One of ordinary skill in the art would recognize other variations, modifications, and alternatives. The moving part 18 is given a displacement, in the layout condition that C holder coincides with C mag in the AF direction 15 in the state that electrical currents do not flow through the coil.

Figure 7:
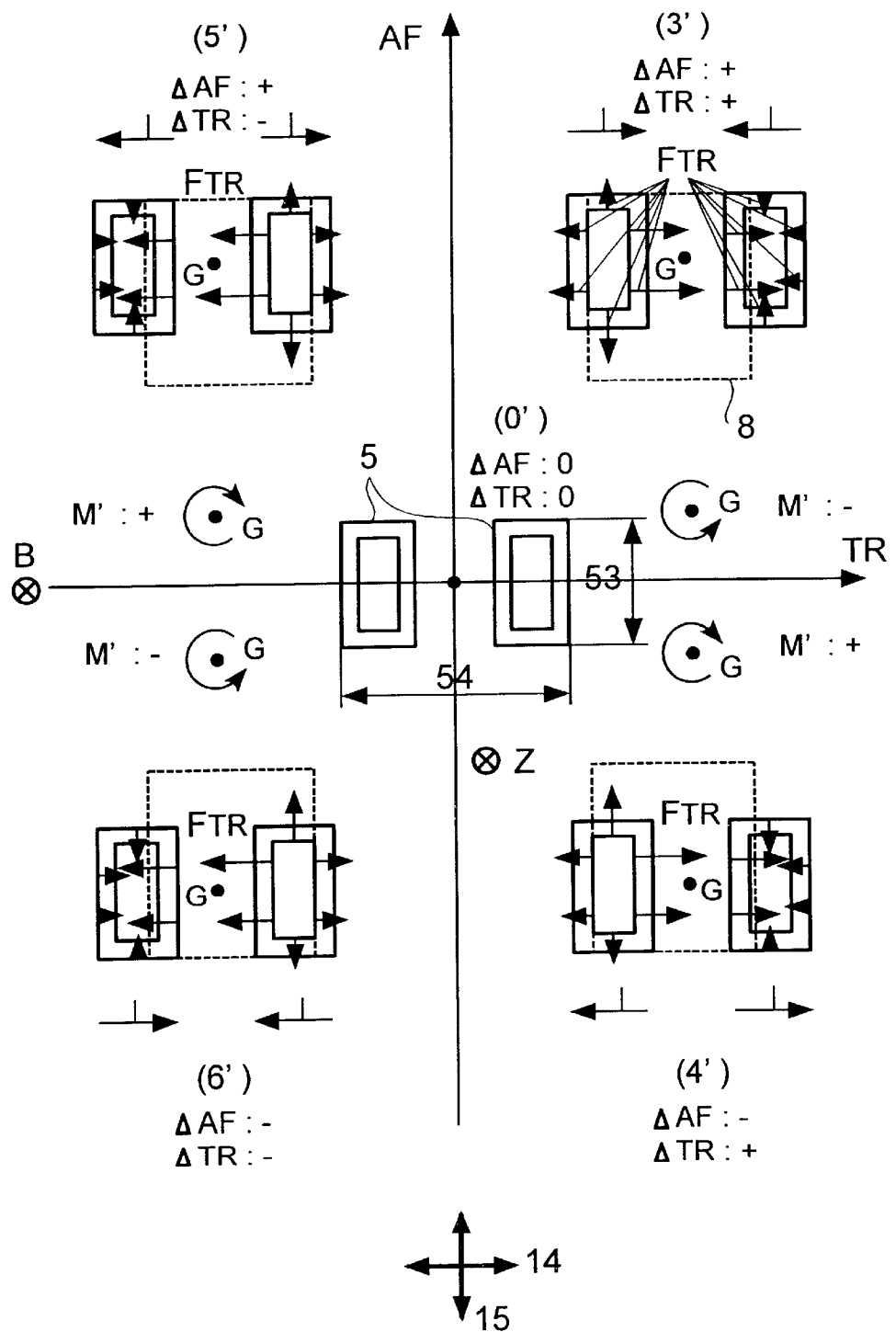
FIG. 7 illustrates a simplified schematic drawing of a representative moment in a tracking coil in a particular embodiment according to the present invention.

Reference numeral 4 in FIG. 6 illustrates AF coil 4 in FIG. 2 viewed from the extending direction 16, parallel to elastic support members 11. Reference numeral 5 in FIG. 7 illustrates TR coil 5 in FIG. 2 viewed from the extending direction 16 parallel to elastic support members 11. In FIG. 6, a moment M of moving part 18 around center of gravity G is the moment of the elastic support members around extending direction 16, perpendicular to the paper in FIG. 6.

As FIGS. 6–7 illustrate, the center of gravity ("G") of moving part 18 can be approximately coincident with the center of the length 51 of the AF coil 4 in the AF direction, the center of the length 53 of the TR coil 5 in the AF direction, and C holder. The center of gravity, G, of the moving part 18 can be approximately coincident with the center of the length 52 of the AF coil 4 in the TR direction, the center of the length 54 of the TR coil 5 in the TR direction, the center of the length of the magnet 5 in the TR direction, and the center of the fixing points 34 on the moving part 18 in the TR direction.

FIG. 6(0) shows the AF coil 4 in a state that the moving part 18 is not displaced either in the AF direction 15 or in the TR direction 14. When a current flows through the AF coil 4, the AF coil 4 is displaced in the AF direction, as shown in FIG. 6(1) and FIG. 6(2). In this case, since the thrust center (FAF: position of the composite vector of the total thrust) of the AF coil 4 and G are coincident in the TR direction 14, a moment by the thrust of the AF coil 4 will not be induced around G.

Next, a case will be discussed, in which currents flow through the AF coil 4 and the TR coil 5, causing the moving part 18 to be displaced in the AF direction 15 and the TR direction 14. As shown in FIG. 6(3) and FIG. 6(4), when the AF coil 4 is displaced in the positive TR direction (TR+), since the thrust center of the AF coil 4 is not coincident with G in the TR direction 14, a moment around G is induced by the thrust of the AF coil 4. When the AF coil 4 is displaced in the positive AF direction (AF+), a positive (clockwise) moment is induced around G; and when displaced in the negative AF direction (AF−), a negative (counterclockwise) moment is induced. Similarly, as shown in FIG. 6(5) and FIG. 6(6), in a state that the AF coil 4 is displaced in the negative TR direction (TR−), when also displaced in the positive (AF+) direction, a negative (counterclockwise) moment is induced; and when displaced in the negative (AF−) direction, a positive (clockwise) moment is induced.

FIG. 7 illustrates a simplified schematic drawing illustrating the direction of an induced moment in the TR coil 5 in a particular embodiment according to the present invention. This diagram is merely an illustration and should not limit the scope of the claims herein. One of ordinary skill in the art would recognize other variations, modifications, and alternatives. FIG. 7 illustrates the moving part 18 in the layout condition that C holder coincides with C mag in the AF direction 15 in a state in which no electrical currents are flowing through the coil. In FIG. 7, the direction of the magnetic flux, ("B"), the direction of the current, ("I"), the current running through the TR coil 5, and the direction of the thrust induced in the TR coil 5 are denoted by the arrows. Here, the coordinate system is the same as in FIG. 6.

FIG. 7(0') shows the TR coil 5 in a state in which the moving part 18 is not displaced either in the AF direction 15 or in the TR direction 14. As shown in FIG. 7(3'), when the TR coil 5 is displaced in the positive AF direction (AF+) and in the positive TR direction (TR+), thrust vectors F TR are induced in the segments of the TR coil 5 forming a distribution in accordance with the flux density distribution across the gap. Therefore, as shown by the arrows in the drawing, the thrust increases as the center of the magnet becomes nearer due to the increase in magnetic flux. Accordingly, a negative (counterclockwise) moment around G is induced in TR coil 5. For the same reason, when the moving part 18 is displaced in the positive AF direction (AF+) and in the negative TR direction (TR−), as illustrated in FIG. 7(4'), a positive (clockwise) moment is induced. When displaced in the negative AF direction (AF−) and in the positive TR direction (TR+), as illustrated in FIG. 7(5'), a positive (clockwise) moment is induced. When displaced in the negative AF direction (AF−) and in the negative TR direction (TR−), as illustrated in FIG. 7(6'), a negative (counterclockwise) moment is induced.

When the directions of the moments shown in FIG. 6 and FIG. 7 are compared, the direction of the moment induced in the AF coil 4 is found to be opposing in direction to that of the moment induced in TR coil 5. This can be true irrespective of the direction in which moving part 18 is displaced. Therefore, in a representative embodiment according to the present invention, dimensions of the magnet 8, AF coil 4, and TR coil 5 can be determined such that the magnitude (absolute value) of the moment induced in the AF coil 4 becomes substantially approximately equal to that of the moment induced in the TR coil 5. In such embodiments, the moments of both of the coils will tend to cancel one another, irrespective of the direction in which the moving part 18 is displaced.

In a representative embodiment according to the present invention, when C holder is coincident with C mag in the AF direction 15 and no electrical current flows through the coils, the moments of both of the coils will tend to cancel one another, irrespective of the direction in which the moving part 18 is displaced. However, if C holder has some displacement from C mag, with no current flowing, the directions of the moments induced when the moving part 18 is displaced are not always coincident with those shown in FIG. 6 and FIG. 7. Thus, in a representative embodiment according to the present invention, the components involved can be laid out in such a manner that C mag is coincident with C holder when current is not flowing through the AF coil 4, in order to reduce the tilt of the lens.

Since the position of the moving part 18 of the objective lens driving unit 1 varies depending on the disposed attitude of the driving unit 1, the position of C holder will vary with respect to that of C mag in the AF direction 15. Accordingly, in a representative embodiment according to the present invention, objective lens driving unit 1 has the layout such that the position of C mag from C wire is approximately d/2 as measured in the AF direction. In specific embodiments, the absolute value of a displacement between C mag and C wire in the horizontal setting can be substantially equal to that of a displacement between C mag and C wire in the vertical setting. In such embodiments, the maximum value of the tilt of the lens can be reduced in both the horizontal setting and the vertical setting.

Table 1 indicates representative example dimensions for W.D.1, W.D.2, L holder and d in a representative embodiment according to the present invention. L wire and L mag can be calculated according to the following equations.

$L\ \text{wire} = (W.D.1 + W.D.2 - d)/2 + L\ \text{holder}$ $L\ \text{mag} = (W.D.1 + W.D.2)/2 + L\ \text{holder}$ Therefore, L wire and L mag can be set according to the representative figures shown in Table 2 in the representative embodiment according to the present invention.

TABLE 1

| W.D.1 | 1.4 mm |
|---|---|
| W.D.2 | 1.8 mm |
| L holder | 2.5 mm |
| d | 0.15 mm |

TABLE 2

| L wire | 4.025 mm |
|---|---|
| L mag | 4.100 mm |

Figure 8:
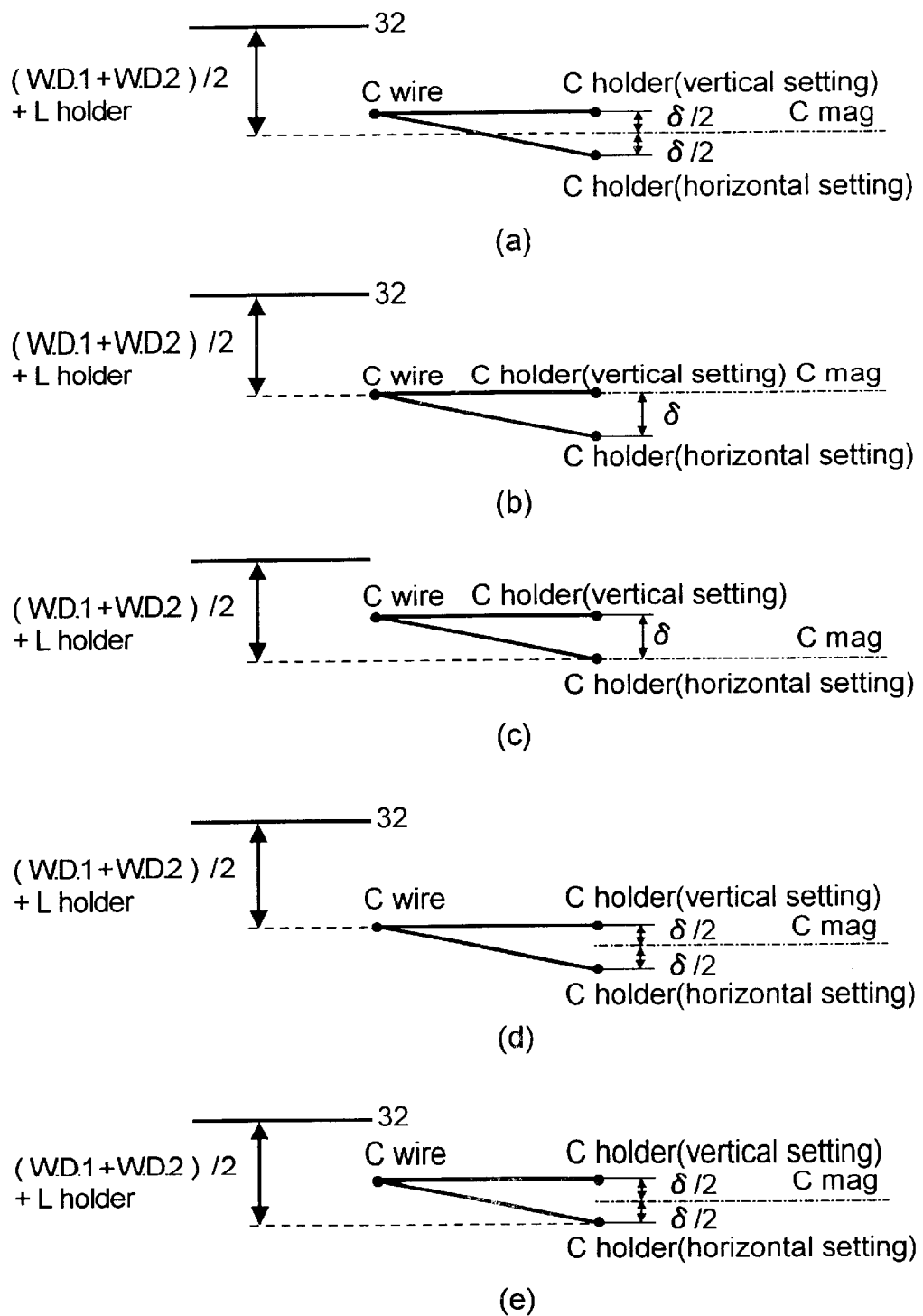
FIG. 8 illustrates a simplified schematic drawing of a representative positional relation of major parts of the disk drive in a particular embodiment according to the present invention.

FIG. 8 illustrates a simplified schematic drawing to simply illustrate the positional relation between the components involved in a particular embodiment according to the present invention. This diagram is merely an illustration and should not limit the scope of the claims herein. One of ordinary skill in the art would recognize other variations, modifications, and alternatives. In FIG. 8, a solid line 32 signifies a surface of a disk placed at a particular position, a dotted line indicates a position apart from the disk surface 32, which in a representative embodiment according to the present invention, can be determined by the relation (W.D.1+W.D.2)/2+L holder, for example. Black dots denote positions for C wire, C holder in the horizontal setting of the objective lens driving unit 1, and C holder in the vertical setting thereof as measured in the AF direction. A dashed line indicates the position of C mag as measured in the AF direction.

The configuration shown in FIG. 4 corresponds to FIG. 8(a), in which the magnet is disposed such that C mag is at a position apart from the disk surface 32 at an approximate distance determined by the relation (W.D.1+W.D.2)/2+L holder. Further, C wire can be positioned overlying from C mag by a distance of approximately d/2. Accordingly, if the objective lens driving unit 1 is horizontally placed, C holder is positioned underlying from C mag by approximately d/2; and if the objective lens driving unit 1 is vertically placed, C holder is positioned overlying from C mag by approximately d/2. This specific embodiment can be effective, as mentioned above, in the reduction of the power consumption as well as the reduction of the tilt of the lens, when both the horizontal setting and the vertical setting are considered.

FIG. 8(b) illustrates another specific embodiment according to the present invention, which is effective when the objective lens driving unit is used in a substantially vertical setting. In specific embodiments, since C mag and C wire (which is approximately equivalent to C holder in the vertical setting) are substantially co-planar. Further C mag and C wire lie at an approximate distance from the disk surface 32 determined by the relation (W.D.1+W.D.2)/2+L holder. The power consumption and the tilt of the lens in the substantially vertical setting can be minimized in such specific embodiments.

The specific embodiment shown in FIG. 8(c) is effective when the objective lens driving unit is used in a substantially horizontal setting. In specific embodiments, C mag lies at an approximate distance from the disk surface 32 determined by the relation (W.D.1+W.D.2)/2+L holder, and C wire lies at an approximate distance from the disk surface 32 determined by the relation (W.D.1+W.D.2)/2+L holder −d. Further, C mag and C holder in the horizontal setting are substantially co-planar and lie at an approximate distance from the disk surface 32 determined by the relation (W.D.1+W.D.2)/2+L holder. The power consumption and the tilt of the lens in the substantially horizontal setting can be minimized in such specific embodiments.

Next, the specific embodiments illustrated by FIG. 8(d) and FIG. 8(e) can be effective in reducing the tilt of the lens for substantially horizontal settings and substantially vertical settings. Further, such specific embodiments can provide for reduced power consumption in either the substantially horizontal setting or the substantially vertical setting.

A representative embodiment according to the present invention illustrated in FIG. 8(d) can provide reduced power consumption chiefly in substantially vertical settings, in which C wire lies at an approximate distance from the disk surface 32 determined by the relation (W.D.1+W.D.2)/2+L holder. Power consumption can be minimized in substantially vertical settings, as well, by many such specific embodiments according to the present invention. However, in some specific embodiments, C mag can be positioned at a distance of approximately d/2 from C wire in the AF direction in order to reduce the tilt of the lens in the substantially horizontal setting and in the substantially vertical setting.

Similarly, specific embodiments such as illustrated in FIG. 8(e) can provide reduced power consumption in substantially horizontal settings. Further, many such specific embodiments can provide for reduced lens tilt characteristics in the substantially horizontal setting and in the substantially vertical setting. The techniques described above can provide specific embodiments according to the present invention having reduced power consumption requirements and reduced lens tilt characteristics.

Figure 9:
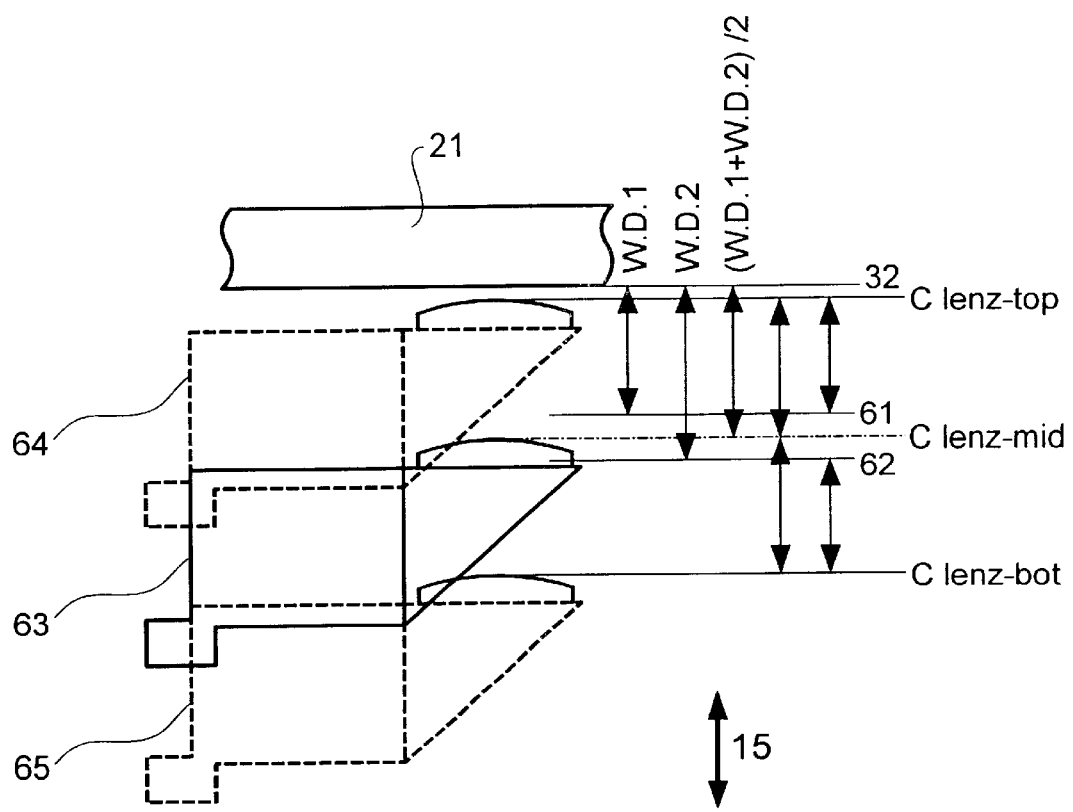
FIG. 9 illustrates a simplified schematic drawing of representative movable ranges in the AF direction in a particular embodiment according to the present invention.

FIG. 9 illustrates a simplified schematic drawing of representative movable ranges in the AF direction in a particular embodiment according to the present invention. This diagram is merely an illustration and should not limit the scope of the claims herein. One of ordinary skill in the art would recognize other variations, modifications, and alternatives. FIG. 9 illustrates a technique for securing an approximately equal movable range in the AF direction for more than one type of disk, such as the two types of disks 41 and 42 illustrated in FIG. 5, for example.

In FIG. 9, an upper state 64 illustrates a state in which the moving part is displaced uppermost in the AF direction. The position of the moving part is where the lens holder 3 is in contact with the upper yoke (not illustrated—see FIG. 4). A lower state 65 illustrates a state in which the moving part is displaced lowermost in the AF direction, and the position of the moving part is where the lens holder 3 is in contact with the yoke 7. Intermediate state 63 illustrates a state in which the moving part is positioned at the intermediate point between state 64 and state 65, for example. Further, C lenz-top, C lenz-bot, and C lenz-mid each indicate the positions of the lens fronts in these cases, respectively. Reference numeral 61 indicates a position of C lenz in FIG. 5(a), namely, the position apart from the surface 32 of a disk placed at the specific position by W.D.1, and reference numeral 62 indicates a position of C lenz in FIG. 5(b), namely, the position apart from the surface 32 of the disk by W.D.2.

In a representative embodiment according to the present invention, the objective lens driving unit can have a movable range such that c lenz-mid, namely, the position of the lens front when the moving part 18 is located at the intermediate point of the movable range in the AF direction 15, is apart from the disk surface 32 by approximately (W.D.1+W.D.2)/2. Thereby, the distance between C lenz-top and the position 61 becomes approximately equal to the distance between the position 62 and C lenz-bot, for example. An approximately equal amount of the movable range in the AF direction can be secured to the disks 41 and 42, for example. This embodiment can be effective in securing an approximately equal amount of movable range to different types of disks.

In the foregoing embodiment thus described, two types of disks are used for explanation, but embodiments having two, three, or more types of disks can be provided for using such techniques according the present invention. In such embodiments, the shortest working distance can be defined as W.D.1 and the longest working distance as W.D.2.

In some embodiments according to the present invention, an objective lens system having optical components, such as a wavelength plate and a dichroic filter, and the like, added to the objective lens can be included. The techniques according to the present invention can be applied in such embodiments as well.

In a representative embodiment according to the present invention, the objective lens driving unit can be configured such that the positions of a disk, a fixing part, and a magnet satisfy the foregoing positional relation.

Representative embodiments according to the present invention can provide suppression of an increase in power consumption arising when different types of disks are reproduced, as well as increases in power consumption and lens tilt arising from changes in the disposed attitude of the disk drive, for example. Further, many embodiments according to the present invention can be realized using substantially conventional manufacturing techniques, so that such embodiments can be implemented at relatively low cost.

CONCLUSION

Although the above has generally described the present invention according to specific systems, the present invention has a much broader range of applicability. In particular, while foregoing has described a specific embodiment having particular proportions and power consumption characteristics, other embodiments having different geometry and proportions can be readily achieved by those of ordinary skill in the art. Further, while the foregoing has been discussed generally with respect to optical disk drives, the techniques of the present invention can be applied to a magneto-optical disk drive, as well as drive units for disks such as CD-ROM, DVD-ROM, DVD-RAM and the like. The specific embodiments described herein are intended to be merely illustrative and not limiting of the many embodiments, variations, modifications, and alternatives achievable by one of ordinary skill in the art. Thus, it is intended that the foregoing description be given the broadest possible construction and be limited only by the following claims.

The preceding has been a description of the preferred embodiment of the invention. It will be appreciated that deviations and modifications can be made without departing from the scope of the invention, which is defined by the appended claims.

What is claimed is:

1. An optical disk drive comprising:
   a spindle motor for rotating an optical disk;
   a laser source for generating a light beam;
   an optical head having an objective lens to converge the light beam onto a recording portion of the surface of the optical disk, a lens holder to hold the objective lens, a plurality of elastic support members to elastically support the lens holder, and a fixing part to fix the elastic support members,
   wherein the fixing part, the plurality of elastic support members and the optical head operatively dispose a front of the objective lens at a working distance from the surface of the optical disk, the working distance variable between a first working distance, W.D.1, and a second working distance, W.D.2,
   wherein the optical head operatively disposes the objective lens at a distance, L holder, being the distance between the front of the objective lens and a center of a plurality of fixing points of the elastic support members on the lens holder in a focusing direction orthogonal to the radius of the optical disk,
   wherein the fixing part is operatively disposed at a distance, L wire, being the distance between the surface of the optical disk and a center of a plurality of fixing points of the elastic support members on the fixing part in the focusing direction, C wire,
   wherein the lens holder is disposed in a direction orthogonal to the radius of the optical disk and receding from the surface of the optical disk a distance, d, being the distance the plurality of elastic support members are biased by a weight of the lens holder in a state that the disk drive is placed substantially horizontally; and
   a slider for moving the optical head in a radius direction of the optical disk;
   wherein the objective lens, the lens holder, the plurality of elastic support members and the fixing part are disposed to satisfy the relation:

$(W.D.1+W.D.2)/2+L$ holder$-d<=L$ wire$<=(W.D.1+W.D.2)/2+L$ holder.

2. The optical disk drive of claim 1, wherein the objective lens, the lens holder, the plurality of elastic support members and the fixing part are disposed to satisfy the relation:

$L$ wire$=(W.D.1+W.D.2-d)/2+L$ holder.

3. The optical disk drive of claim 1, wherein the optical head further comprises a magnet, the optical head arranged so that a center position of the magnet in the focusing direction, C mag, is disposed a distance of substantially d/2 from C wire in a direction orthogonal to the radius of the optical disk and receding from the surface of the optical disk.

4. The optical disk drive of claim 1, wherein the optical head is moved in a movable range, the movable range having a center, such that when the optical head is disposed at the center of the movable range, a point on the surface of the objective lens in the focusing direction, C lenz, is disposed a distance from the optical disk surface of approximately (W.D.1+W.D.2)/2.

5. The optical disk drive of claim 1 wherein the optical disk further comprises a CD-ROM.

6. The optical disk drive of claim 1 wherein the optical disk further comprises a DVD-ROM.

7. An apparatus for accessing information stored on an optical disk, said apparatus comprising:
   a laser source for generating a light beam;
   an optical head having an objective lens to converge the light beam onto a recording portion of the surface of the optical disk, a lens holder to hold the objective lens, a plurality of elastic support members to elastically support the lens holder, and a fixing part to fix the elastic support members,
   wherein the fixing part, the plurality of elastic support members and the optical head operatively dispose a front of the objective lens at a working distance from the surface of the optical disk, the working distance variable between a first working distance, W.D.1, and a second working distance, W.D.2, wherein the optical head operatively disposes the objective lens at a distance, L holder, being the distance between the front of the objective lens and a center of a plurality of fixing points of the elastic support members on the lens holder in a focusing direction orthogonal to the radius of the optical disk, wherein the fixing part is operatively disposed at a distance, L wire, being the distance between the surface of the optical disk and a center of a plurality of fixing points of the elastic support members on the fixing part in the focusing direction, C wire, wherein the lens holder is disposed in a direction orthogonal to the radius of the optical disk and receding from the surface of the optical disk a distance, d, being the distance the plurality of elastic support members are biased by a weight of the lens holder in a state that the disk drive is placed substantially horizontally; and wherein the objective lens, the lens holder, the plurality of elastic support members and the fixing part are disposed to satisfy the relation:

$$(W.D.1+W.D.2)/2+L\ holder-d <= L\ wire <= (W.D.1+W.D.2)/2+L\ holder.$$

8. The apparatus of claim 7, wherein the objective lens, the lens holder, the plurality of elastic support members and the fixing part are disposed to satisfy the relation:

$$L\ wire = (W.D.1+W.D.2-d)/2+L\ holder.$$

9. The apparatus of claim 7, wherein the optical head further comprises a magnet, the optical head arranged so that a center position of the magnet in the focusing direction, C mag, is disposed a distance of substantially d/2 from C wire in a direction orthogonal to the radius of the optical disk and receding from the surface of the optical disk.

10. The apparatus of claim 7, wherein the optical head may be moved in a movable range, the movable range having a center, such that when the optical head is disposed at the center of the movable range, a point on the surface of the objective lens in the focusing direction, C lenz, is disposed a distance from the optical disk surface of approximately (W.D.1+W.D.2)/2.

11. The apparatus of claim 7 wherein the optical disk further comprises a CD-ROM.

12. The apparatus of claim 7 wherein the optical disk further comprises a DVD.

* * * * *